3,681,138
PROCESS FOR PREPARING MAGNETIC TAPES

Fritz Ankenbrand, Neuried, Kurt Herrmann, Pullach, and Werner G. Wilke, Starnberg, Germany, assignors to Agfa-Gevaert Aktiengesellschaft, Leverkusen, Germany
Filed Feb. 3, 1970, Ser. No. 8,238
Claims priority, application Germany, Feb. 13, 1969, P 19 07 212.9
Int. Cl. H01f 10/00
U.S. Cl. 117—238         5 Claims

ABSTRACT OF THE DISCLOSURE

Magnetic tapes are prepared wherein magnetizable, binding-agent-containing coatings are applied upon a supporting film with an extrusion molding of non-ferromagnetic material. The extrusion orifice is disposed opposite a magnetized edge over which the film glides and runs off in the field direction at a field intensity of 100 to 500 oe., with the field intensity at the edge being above 700 oe. and having a gradient of more than 500 oe./cm.

BACKGROUND OF THE INVENTION

This invention relates to the employment and the arrangement of a magnet system in the preparation of magnetic tapes with privileged direction by means of the extrusion process.

Among the known magnetic tape preparation processes such as dipping, screen printing and depositing processes, the extrusion process appears the most advantageous. In comparison with other molding or casting processes, the extrusion molding process offers the advantage of a closed, reflux-free molding system. In view of the tendency of magnetic suspension for sedimentation and separation, this is particularly important. Furthermore, in the preparation of technical magnetic tapes, such as video and computer tapes, it is of decisive importance to keep the so-called dropouts down to the lowest possible number. For this particular purpose also, the extrusion process seems especially suitable as the closed pouring system.

It is known to prepare magnetic tapes according to the extrusion process with the additional use of a magnet (British Pat. 1,059,104). In this process, the magnetic suspension is poured through an extrusion slot onto the coating support, which is wrapped around a molding roller and runs off from there in perpendicular direction. Both the molding device, as well as the outer casing of the molding consist of a ferromagnetic material. The thickness of the wet coating on the support film amounts to about one-fifth the width of the extrusion slot. The liquid band between the extrusion cut-out and the support film is accordingly stretched five-fold. The development of a cohesive liquid tape is achieved by the effect of a nearly homogeneous magnetic field. For this purpose a horseshoe magnet is utilized whose north pole is situated below the extrusion cut-out and whose south pole is situated at the run-off side of the support film on the molding roller in its direct proximity.

The arrangement of the horseshoe magnet in the described process requires a minimum distance from the coat-forming liquid meniscus and consequently a very small absolute field intensity at this point. This arrangement makes it impossible to achieve an optimum stabilization of the meniscus, so that both the molding speed as well as the stretching of the liquid tape should be limited between the pourer discharge and coating support. Since the molding slot cannot be made arbitrarily small, the process for the molding of particularly thin magnetizable coatings seems hardly suitable. Furthermore, this process is sensitive to electrostatic charges of the support film which are practically unavoidable. These charges disturb the stability of the coat-forming meniscus and lead to spotty casting thickenings. The magnetic tape consequently becomes useless.

SUMMARY OF INVENTION

The object of this invention is to provide a molding process by means of which from highly viscous magnetic molding solutions, even very thin layers of 2 to 3μ thickness, may be prepared, and molding speeds of more than 100 meters per minute may be achieved. Since by means of thin layers, high recording densities may be achieved, the molding of such films for the preparation of technical magnetic tapes is particularly important.

The process for applying magnetizable layers onto a film support by means of an extrusion pourer of a non-ferromagnetic material occurs, according to the invention, in that a magnetic edge is disposed opposite the extrusion orifice, the film support gliding over the edge and running off in field direction at a field intensity of 100–500 oe., wherein the field intensity at the edge is over 700 oe. and has a gradient of more than 500 oe./cm.

THE DRAWINGS

DETAILED DESCRIPTION

Figure 2:
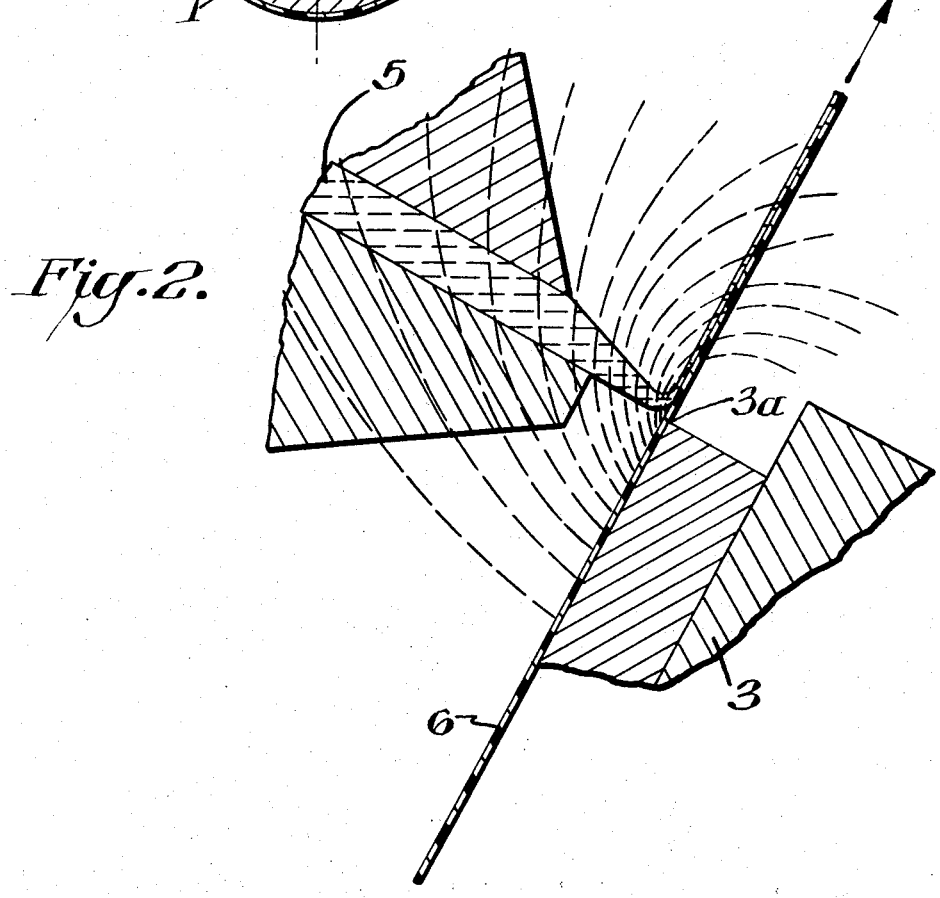
FIG. 2 shows the arrangement of FIG. 1 in the area of the film-forming liquid meniscous, in cross-section.

The support film 6 to be coated is conducted over two rollers 1 and 2 in such a manner that it moves over the polar surface of a magnet 3 arranged between the rollers. The extrusion pourer 4 is situated opposite the upper edge 3a of the magnet and with its slot 5 is directed somewhat perpendicular to the support film. By means of a dosing pump, the molding suspension is now conducted into the molding device, the suspension being exposed to the influence of the magnetic field upon discharge from the molding device. The magnet, per se, a permanent or an electromagnet, has a rectangular shape whose level polar surfaces are limited by straight-line edges. Over the one polar surface of the magnet moves the film to be coated, and the extrusion orifice is located opposite the upper edge of the polar surface. Since the magnetic edge is located under the film, great forces may be exerted on the suspension without it adhering to the magnet and the preparation process becoming unaccomplishable. At edge 3a the field has a maximum density, a field gradient of more than 500 oe./cm. being present. This gradient is directed at the discharge slot and has a force component counter the direction of course of the tape. Thereby results the development of a liquid cushion as well as its stabilization. Only due to this is it possible to pour very thin coatings and to make the meniscus insensitive to disruptive forces, which may emanate for example from the electrostatic charge of the support film. As further obvious from FIG. 2, the support film is conducted in such a manner that the magnetic suspension upon running off from the magnet edge is situated in a magnetic longitudinal field. The longitudinal field has an intensity of at least 500 oe. and effects an adjustment of the magnetic particles, so that a magnetic anisotropic tape results whose light axis lies in the course direction. This magnetic anisotropy is currently strived for with respect to all magnetic tapes, since it allows a better recording of short wave lengths.

The novel formation of the magnet and the reciprocal position of the pourer and magnet makes possible the following advantageous molding conditions:

The distance between the extrusion outlet and supporting film can be very large (>1 mm.). Thereby, in continuous coating, for example, the passing through by splices is completely avoided as a problem.

The liquid tape issuing from the extruder may be stretched by more than the 30-fold of its original thickness. This is particularly to be emphasized, since according to the laws of laminar channel flow (Hagen-Poiseuille's law), the fluctuations in the slot clearance of the molder enters with the third potential into the thickness variations of the poured layer. Since the molder slot always has certain manufacturing tolerances, the percentage error in the slot clearance and consequently also the percentage variation in the layer thickness becomes smaller the larger the slot clearance is in a given film thickness.

Rates of pouring of at least 100 to 200 m./min. are achieved without the film-forming liquid meniscus becoming susceptible to trouble.

Figure 1:
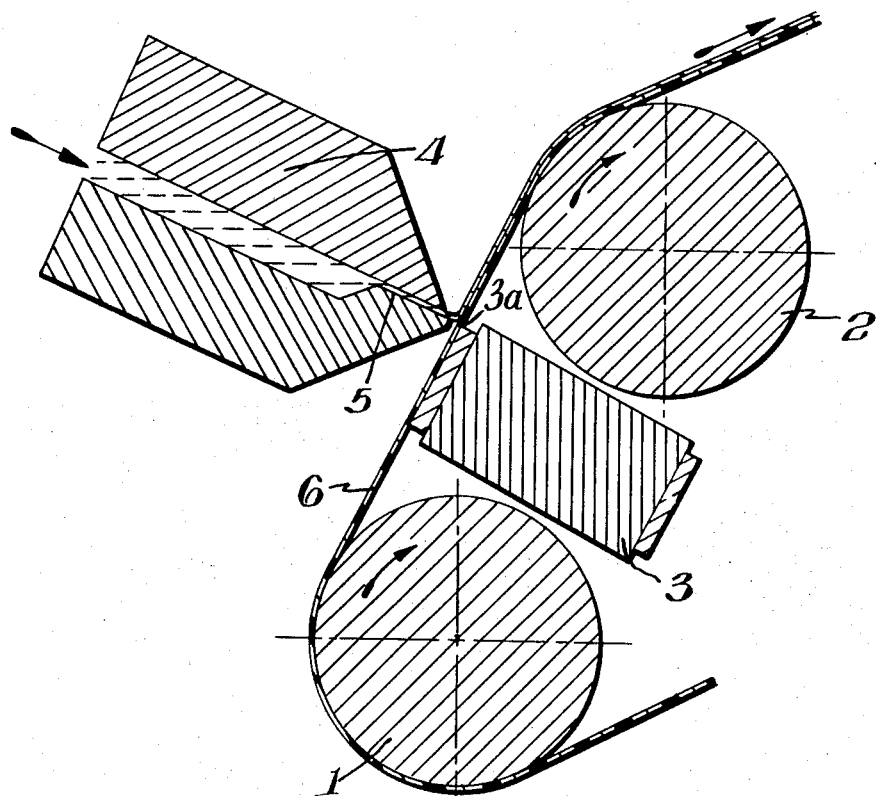
FIG. 1 shows a schematic top view of the molding device in accordance with this invention.

The following example shows a use of the process wherein the arrangement of molder and magnet corresponds to FIG. 1. The simply constructed extrusion molder consists of the supply line for the molding suspension, of a distribution chamber, and of the pouring slot formed by two parallel walls. The magnet used herein is a permanent magnet constructed in the form of brickwork of individual barium ferrite parallelepiped blocks. The polar surfaces each are covered with a rectangular soft iron magnetic border.

The casting solution consists of an adhesive-containing, magnetizable iron oxide suspension which has a viscosity of 3500 cp. at low shear stresses. The width of the extrusion slot is 0.5 mm., the distance of the extrusion outlet from the supporting film is 1 mm. The suspension extruded from the molding slot coats the supporting film, whose speed is 28 times greater than the average flow speed in the molding slot. The magnetic suspension is accordingly stretched by the 28-fold upon discharge from the extruder and has a wet film thickness of 0.018 mm. on the supporting film. The velocity of the film is 100 m./min.

For the preparation of a 0.06 mm. wet magnetic sound coating, according to the novel process, only a 1.0 mm. slot width is required as compared to the 0.3 mm. according to the process disclosed in the British Pat. 1,059,104, which not only brings with it manufacturing simplification but also slight fluctuations in the thickness of the molded film.

What is claimed is:

1. In a process for preparing magnetic tapes the improvement comprising the steps of passing a film over spaced conveying means and over the magnetized edge of a magnet disposed between the spaced conveying means, extruding a coating of magnetizable particles dispersed in a binder upon the moving film with the extrusion device being of non-ferromagnetic material and having its extrusion orifice in line with said magnetized edge, and passing the film in field direction at a field intensity of 100 to 500 oe. with a field intensity at said edge being above 700 oe. and having a gradient of more than 500 oe./cm.

2. In the process of claim 1 wherein the magnetic edge is produced by a permanent magnet.

3. In the process of claim 2 wherein the permanent magnet consists of barium ferrite.

4. In the process of claim 1 wherein the magnetic edge is produced by a direct current magnet.

5. In the process of claim 1 wherein the magnetic edge is produced by an alternating current magnet.

References Cited

UNITED STATES PATENTS

| | | | |
|---|---|---|---|
| 2,711,901 | 6/1955 | Behren | 117—238 X |
| 2,796,359 | 6/1957 | Speed | 117—238 |
| 3,191,106 | 6/1965 | Baermann | 118—637 UX |
| 3,256,112 | 6/1966 | Camras | 117—238 |
| 3,413,141 | 11/1968 | Friedman | 117—238 |
| 3,117,065 | 1/1964 | Wootten | 117—238 |

FOREIGN PATENTS

| | | | |
|---|---|---|---|
| 756,039 | 4/1967 | Canada | 117—238 |
| 561,290 | 5/1944 | Great Britain | 117—93.2 |

WILLIAM D. MARTIN, Primary Examiner

B. D. PIANALTO, Assistant Examiner

U.S. Cl. X.R.

117—93.2, 235; 118—637